United States Patent [19]
Kumagai et al.

[11] Patent Number: 5,737,154
[45] Date of Patent: Apr. 7, 1998

[54] ROTARY MAGNETIC HEAD APPARATUS WITH CIRCUITRY FOR DRIVING HEAD AND CIRCUITRY FOR TRANSMITTING OUTPUT SIGNALS IN NONCONTACT FASHION DISPOSED ON ROTARY DRUMS

[75] Inventors: Seiji Kumagai, Miyagi; Masatoshi Hayakawa, Kanagawa; Hiroshi Morita, Miyagi; Norikatsu Fujisawa, Miyagi; Junichi Honda, Miyagi; Yuji Nakano, Miyagi, all of Japan

[73] Assignee: Sony Corporation, Tokyo, Japan

[21] Appl. No.: 666,652

[22] Filed: Jun. 18, 1996

[30] Foreign Application Priority Data

Jun. 21, 1995 [JP] Japan ................................ 7-178248

[51] Int. Cl.$^6$ ................................................ G11B 5/52
[52] U.S. Cl. ................................................ 360/108
[58] Field of Search ........................... 360/107, 108, 360/84–85

[56] References Cited

U.S. PATENT DOCUMENTS 5,521,779  5/1996  Arakawa ............................ 360/108

Primary Examiner—A. J. Heinz
Attorney, Agent, or Firm—Hill, Steadman & Simpson

[57] ABSTRACT

A rotary magnetic head apparatus is provided which is capable of reliably supplying DC power for driving to an active-type reproducing head provided within a rotary drum and which is capable of taking the reproductive output signal of the active-type head to the outside of the drum. The rotary magnetic head apparatus includes a fixed drum, a rotary drum which is rotatable with respect to the fixed drum, an active-type reproducing head, disposed on the rotary drum, for reproducing information from a magnetic tape, a constant-current circuit, disposed on the rotary drum, for supplying a constant current for driving the head to the active-type reproducing head, a noncontact signal transmission device for taking the reproductive output signal which is output when the active-type reproducing head reproduces information from the magnetic tape to the outside of the rotary drum, and a sliding-type contact device for supplying external DC power to the constant-current circuit.

10 Claims, 11 Drawing Sheets

ROTARY MAGNETIC HEAD APPARATUS WITH CIRCUITRY FOR DRIVING HEAD AND CIRCUITRY FOR TRANSMITTING OUTPUT SIGNALS IN NONCONTACT FASHION DISPOSED ON ROTARY DRUMS

BACKGROUND OF THE INVENTION

1. Field of the Invention

The present invention relates to a rotary magnetic head apparatus which is suitable for use in a video tape recorder (VTR) or the like.

2. Description of the Related Art

In video tape recorders or digital audio systems, since a tape-like recording medium, such as a magnetic tape, must achieve a high-recording density, when information is recorded on or is reproduced from a magnetic tape, hitherto, a helical scanning method has been employed. The use of this helical scanning method makes it possible to increase the relative speed between the magnetic tape and the magnetic head.

A rotary magnetic head apparatus of a helical scanning method includes a rotary drum and a fixed drum, with a recording head, a reproducing head and the like being housed within the rotary drum. Therefore, the exchange of the reproductive signals of the recording head and the recording current of the recording head is performed between the rotary magnetic head apparatus and external apparatuses via a rotary transformer which is an example of a contact-type signal transmission means.

In the meantime, since there has been a demand for a recording medium, such as a magnetic tape, to have a large capacity and a high transfer rate, a magnetoresistive element head (MR head) having a higher reproduction sensitivity has begun to be employed in place of a magnetically inductive head in a system of a hard disk drive (HDD) or the like.

An active head capable of obtaining a higher reproductive output than that of an inductive head, such as a magnetoresistive element head, has attracted attention as means for achieving the high-density recording of the next generation.

In the meantime, there has been a demand for a rotary magnetic head apparatus of the helical scanning method to have a high recording density.

FIG. 12 shows the construction of a conventional rotary magnetic head apparatus. The conventional rotary magnetic head includes a recording system 600 and a reproduction system 700. A fixed drum 601 and a rotary drum 602 are placed in each of the recording system 600 and the reproduction system 700. The recording system 600 of the fixed drum 601 includes a recording circuit 603 and a coil 604 of a stator core of a rotary transformer. The recording system 600 of the rotary drum 602 includes an inductive recording head 605 and a coil 606 of a rotor core of the rotary transformer.

The reproduction system 706 of the fixed drum 601 includes a reproducing circuit 604 and a coil 607 of a stator core of the rotary transformer. The reproduction system 700 of the rotary drum 602 includes an inductive reproducing head 608 and a coil 609 of the rotor core of the rotary transformer.

In the recording system 600, when an electric current of the recording circuit 603 is supplied to the reproducing circuit 604 of the stator core, a signal is transmitted without contact to the coil 606 of the rotor core by the action of the rotary transformer, a current generated in the coil 606 of the rotor core acts on the inductive recording head 605, and thus the signal is recorded on a magnetic tape T by a helical scanning method.

In the reproduction system 700, information recorded on the magnetic tape T is reproduced by the inductive reproducing head 608, and a current is generated in the coil 609 of the rotor core. This current of the coil 609 of the rotor core is transmitted to the coil 607 of the stator core without contact between the coils and is then supplied to the reproducing circuit 604. As a result, the reproducing circuit 604 is able to obtain a reproductive output signal of the inductive reproducing head 608.

This type of active head, because a DC power-supply is required to drive it, can be easily used in a system in which it is easy to supply power necessary to drive the head and easy to process the reproductive output of the head, for example, a ¼-inch-width tape data streamer, or a hard disk drive (HDD), as can be seen in an example of a magnetoresistive element head in a hard disk drive.

However, in the rotary magnetic head apparatus of the helical scanning method, when an active head is used as a reproducing head, there are the following problems. For example, it is difficult to supply the DC power required to drive this reproducing head, and it is difficult to take the reproductive output obtained from the active head to the outside of the rotary magnetic head apparatus.

In such a hard disk drive, since control of the position of the head on the recording media is performed with a relatively high degree of precision, the high recording density of the recording media is achieved by lessening the track width, and the value has already become less than 10 μm. This causes a decrease in the output signal, and thus a head having a still higher output is demanded. Therefore, a shift is in progress from the magnetically inductive head to the magnetoresisitive element head.

As compared with this, in a tape-pass system comprising the above-described rotary magnetic head apparatus of a helical scanning method, it is difficult to control the position of the head with respect to the magnetic pattern on the magnetic tape due to problems with mechanical precision and tape deformation. Therefore, at present, a format having a recording track width of 10 μm or less is not available.

In the meantime, through advances in the recent rotary magnetic head apparatus (drum) technology and the development of a tape which is resistant to deformation, an environment in which a system having a track width of 10 μm or less can be constructed has become available. In this case, insufficiency of reproductive output of the reproducing head is expected in the same way as in the hard disk drive. Therefore, there occurs a need to employ an active head, such as a magnetoresistive element head, in place of a magnetically inductive head.

However, an active head requires energy from outside in the operation of reproducing the signal thereof. For example, in the case of the magnetoresistive element head, a sense current which is a constant current, and further, a bias current in some cases, are required. In a case in which these active heads are incorporated into the rotary drum which rotates, the supply of power for driving the active heads and the method of taking out the reproductive signal become problems. These problems of the supply of power for driving the active heads and the method of taking out the reproductive signal present a barrier to the employment of active heads in the rotary magnetic head apparatus of the helical scanning method.

SUMMARY OF THE INVENTION

The present invention has been achieved to solve the above-described problems. Accordingly, it is an object of the present invention to provide a rotary magnetic head apparatus which is capable of reliably supplying a DC power-supply for driving the active-type reproducing head provided within a rotary drum, and which is capable of taking the reproductive output signal of the active-type head to the outside of the drum when a helical scanning method is employed.

The above object can be achieved, in an embodiment of the present invention, by a rotary magnetic head apparatus for reproducing information from a tape-like recording medium by a helical scanning method, the rotary magnetic head apparatus comprising: a fixed drum; a rotary drum which is rotatable with respect to the fixed drum; a reproducing head, disposed on the rotary drum, for reproducing information from the tape-like recording medium; a constant-current circuit, disposed on the rotary drum, for supplying a constant current for driving the head to an active-type reproducing head of the rotary drum; noncontact signal transmission means for taking a reproductive output signal which is output when the active-type reproducing head of the rotary drum reproduces information from the tape-like recording medium to the outside of the rotary drum; and sliding-type contact means for supplying an external DC power to the constant-current circuit of the rotary drum.

In an embodiment of the present invention, preferably, the active-type reproducing head is a magnetic-resistance element head.

In an embodiment of the present invention, preferably, the sliding-type contact means comprises a conductive ring which is set on the rotary drum, and a conductive brush-like member which slides on the outer peripheral portion of the conductive ring.

In an embodiment of the present invention, preferably, the rotary drum comprises a recording head for recording information on a tape-like recording medium by a helical scanning method.

In an embodiment of the present invention preferably, the noncontact signal transmission means, and a signal processing section for processing the reproductive output signal before the reproductive output signal of the active-type reproducing head is taken outside the rotary drum by the noncontact signal transmission means constitute a reproductive voltage conversion circuit.

In an embodiment of the present invention, preferably, the constant-current circuit including a constant-current source comprises an inductor.

In an embodiment of the present invention, preferably, there is provided a rotary magnetic head apparatus for reproducing information from a tape-like recording medium by a helical scanning method, the rotary magnetic head apparatus comprising: a fixed drum; a rotary drum which is rotatable with respect to the fixed drum; a reproducing head, disposed on the rotary drum, for reproducing information from the tape-like recording medium; a constant-current source, disposed outside the rotary drum, for generating a constant current for driving an active-type reproducing head of the rotary drum; sliding-type contact means for supplying a constant current for driving the head of the constant-current source to the active-type reproducing head of the rotary drum; and noncontact signal transmission means for taking a reproductive output signal which is output when the active-type reproducing head of the rotary drum reproduces information from the tape-like recording medium to the outside of the rotary drum.

In an embodiment of the present invention preferably, the active-type reproducing head is a magnetoresistive element head.

In an embodiment of the present invention, preferably, the sliding-type contact means comprises a conductive ring which is set on the rotary drum, and a conductive brush-like member which slides on the outer peripheral portion of the conductive ring.

In an embodiment of the present invention, preferably, the rotary drum comprises a recording head for recording information on a tape-like recording medium by a helical scanning method.

In an embodiment of the present invention, preferably, the noncontact signal transmission means, and a signal processing section for processing the reproductive output signal before the reproductive output signal of the active-type reproducing head is taken outside the rotary drum by the noncontact signal transmission means constitute a reproductive voltage conversion circuit.

In an embodiment of the present invention, preferably, an inductor is provided between the sliding-type contact means and the active-type head.

According to an embodiment of the present invention, the rotary drum is rotatable with respect to the fixed drum, and the constant-current circuit provided on the rotary drum supplies a constant current for driving the head to the active-type reproducing head. The noncontact signal transmission means takes a reproductive output signal of the active-type reproducing head of the rotary drum to the outside of the rotary drum. The sliding-type contact means supplies an external DC power to the constant-current circuit of the rotary drum.

In this way, a constant current for driving the head is supplied to the active-type reproducing head of the rotary drum, and the reproductive output signal of the active-type reproducing head can be taken outside the rotary drum.

According to an embodiment of the present invention, the signal processing section of the reproductive voltage conversion circuit processes the reproductive output signal before the signal is taken outside the rotary drum. As a result, it becomes easy for the noncontact signal transmission means to take the reproductive output signal of the active-type reproducing head to the outside of the rotary drum.

According to an embodiment of the present invention, since an inductor is provided in the constant-current circuit, a decrease in the reproductive output signal as a result of the reverse flow of the output of the active-type reproducing head to the constant-current source can be prevented.

According to an embodiment of the present invention the rotary drum is rotatable with respect to the fixed drum, and a constant current for driving the head of the constant-current source placed outside the rotary drum is supplied via the sliding-type contact means to the active-type reproducing head of the rotary drum. The noncontact signal transmission means is able to take the reproductive output of the active-type reproducing head of the rotary drum to the outside of the rotary drum.

As a result, a constant current for driving the head is supplied to the active-type reproducing head, and the reproductive output signal of the active-type reproducing head can be taken outside the rotary drum.

According to an embodiment of the present invention the signal processing section of the reproductive voltage conversion circuit processes the reproductive output signal before the signal is taken outside the rotary drum. As a result, it becomes easy for the noncontact signal transmission means to take the reproductive output signal of the active-type reproducing head to the outside of the rotary drum.

According to an embodiment of the present invention, since an inductor is provided between the sliding-type contact means and the active-type head, it is possible to prevent a decrease in the output as a result of the reverse flow of the output of the reproducing head to the constant-current source side.

The above and further objects, aspects and novel features of the invention will become more apparent from the following detailed description when read in connection with the accompanying drawings.

DESCRIPTION OF THE PREFERRED EMBODIMENTS

The preferred embodiments of the present invention will be described in detail with reference to the accompanying drawings.

Since the embodiments which will be described below are the preferred specific examples of the present invention, various technically preferable limitations are provided. However, the scope of the invention is not limited to these embodiments in the following description unless otherwise particularly described to limit the present invention.

[First Embodiment]

Figure 1:
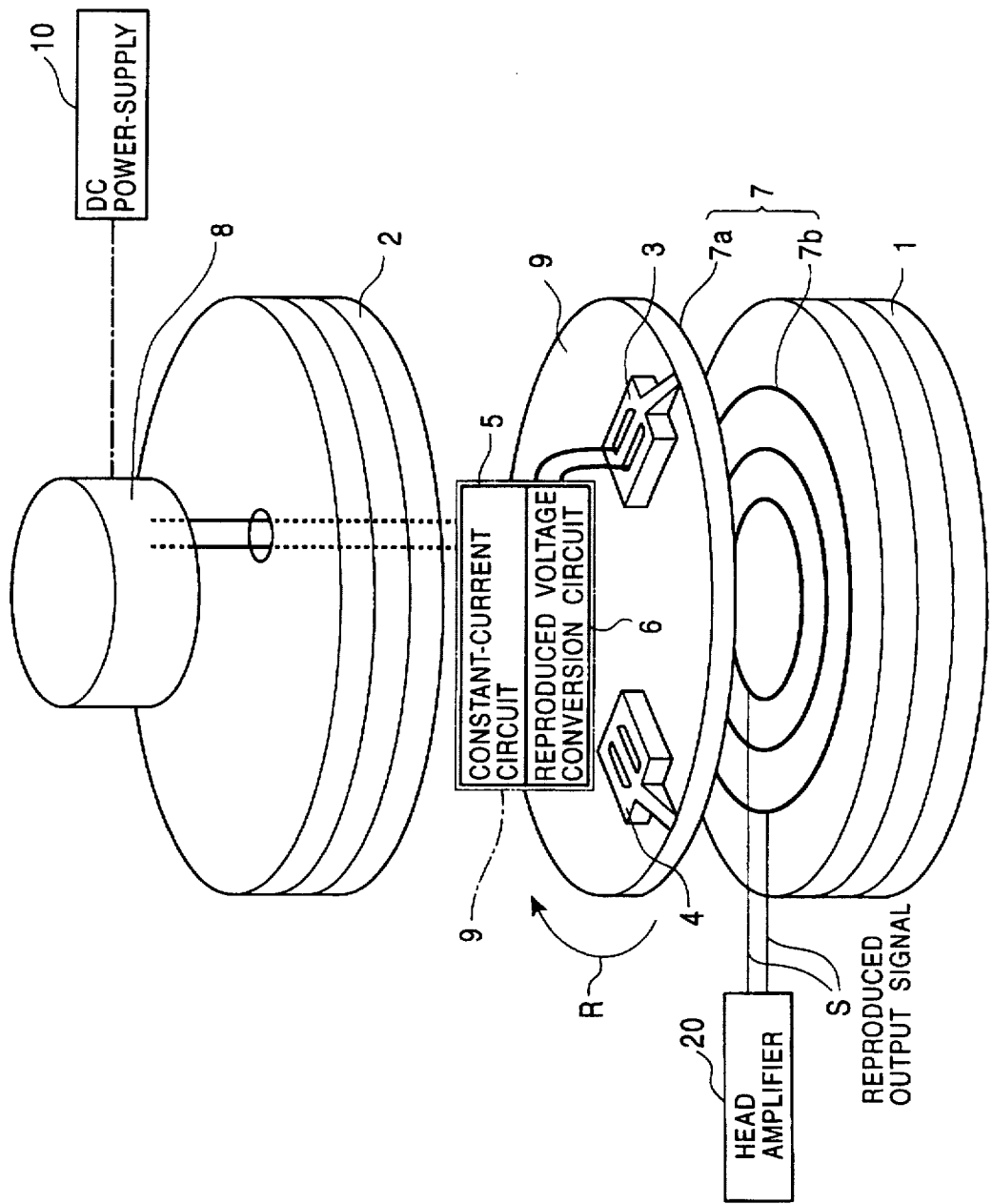
FIG. 1 is a perspective view illustrating a preferred embodiment of a rotary magnetic head apparatus of the present invention.

FIG. 1 is an exploded perspective view illustrating the outline of a preferred embodiment of a rotary magnetic head apparatus of the present invention.

The rotary magnetic head apparatus of FIG. 1 includes a fixed drum 1, a rotary drum 2, a magnetoresistive element head 3 which is an active-type reproducing head, a recording head 4, a constant-current circuit 5, a reproductive voltage conversion circuit 6, a rotary transformer 7 which is a noncontact signal transmission means, and a slip ring 8 which is a sliding-type contact means.

Figure 2:
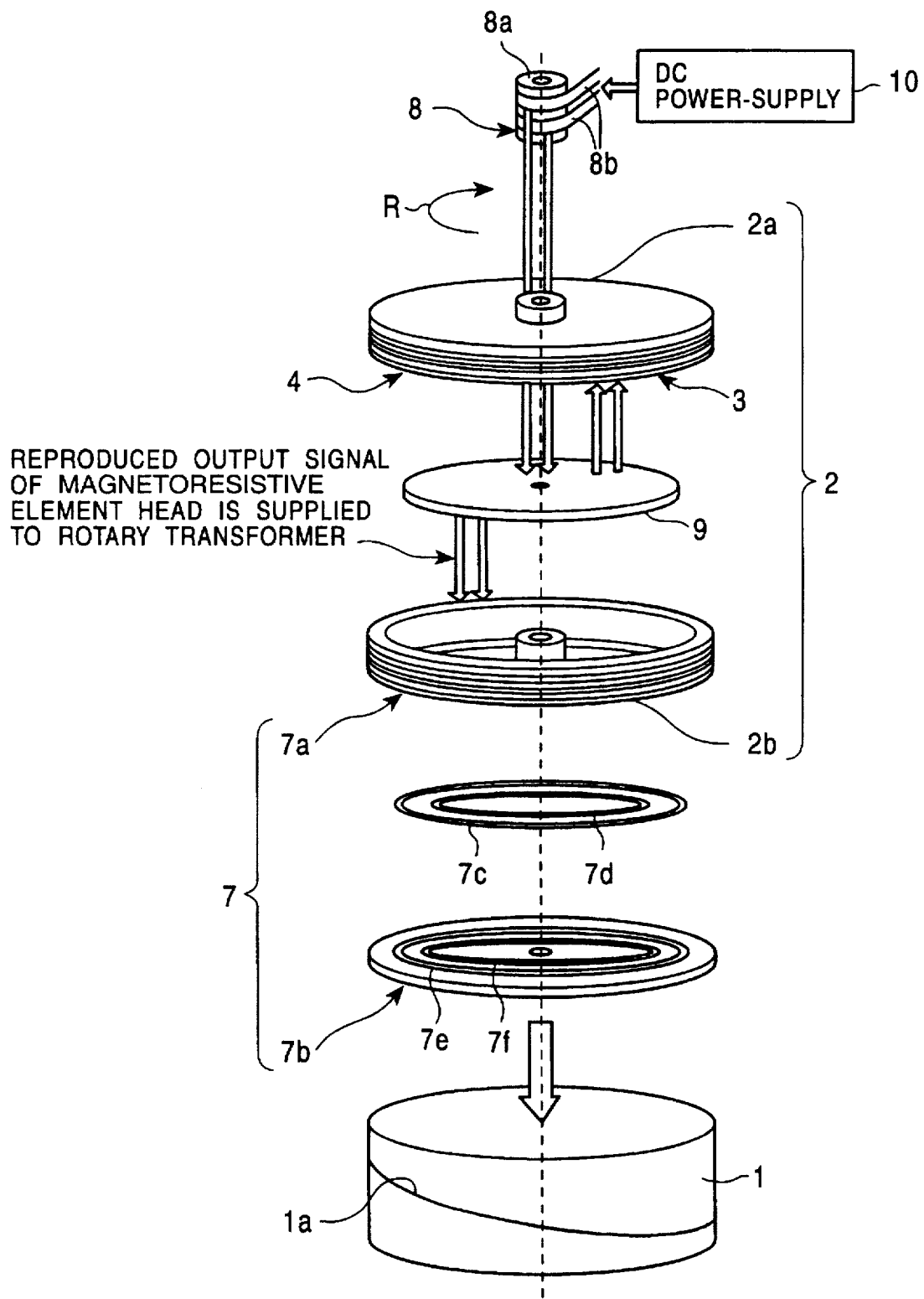
FIG. 2 is an exploded perspective view illustrating in detail the construction of the first embodiment of FIG. 1.

FIG. 2 is an exploded perspective view illustrating in more detail the rotary magnetic head apparatus of FIG. 1.

Referring to FIGS. 1 and 2, the fixed drum 1 and the rotary drum 2 of the rotary magnetic head apparatus constitute what is commonly called a two-layer type head apparatus, with a lead portion 1a for guiding a magnetic tape being formed on the fixed drum 1. The shaft of the magnetoresistive element head 3 is rotatably supported with respect to the fixed drum via bearings or the like.

The fixed drum 1 is a lower drum, and the rotary drum 2 is an upper drum. The rotary drum 2 is comprised of a top portion 2a of the rotary drum and a bottom portion 2b of the rotary drum. Disposed between the top portion 2a and the bottom portion 2b of the rotary drum are the magnetoresistive element head 3, the recording head 4 and a circuit board 9, all of which are shown in FIG. 1. Formed on this circuit board 9 are the constant-current circuit 5, the reproductive voltage conversion circuit 6 and the like.

As the recording head 4, a conventional inductive head may be used. The magnetoresistive element head 3 which is an active-type head will be described later.

The rotary transformer 7, which is a noncontact signal transmission means, includes a rotor core 7a and a stator core 7b. The rotor core 7a is formed, for example, on the under surface of the bottom portion 2b of the rotary drum of FIG. 2. Coils 7c and 7d are arranged in a ring shape and concentrically on such rotor core 7a. A plurality of coils 7e and 7f are arranged in a ring shape and concentrically on such rotor core 7b. The rotor core 7a and the stator core 7b are spaced to face each other with a very small spacing.

The slip ring 8 which is a sliding-type contact means includes a conductive ring-shaped member 8a and a plurality of conductive brush-shaped members 8b. The conductive brush-shaped members 8b and 8b are connected to a DC power-supply 10 provided outside the rotary magnetic head apparatus. The ring-shaped member 8a preferably includes two electrically insulated portions, each of which is formed with a groove. The brush-shaped member 8b is fitted into the groove of the ring-shaped member 8a so that the member 8b comes in contact with the ring-shaped member 8a. This ring-shaped member 8a is formed into one unit with the rotary drum 2 and rotates synchronously in the direction of the arrow R as the rotary drum 2 rotates with respect to the fixed drum 1.

Figure 3:
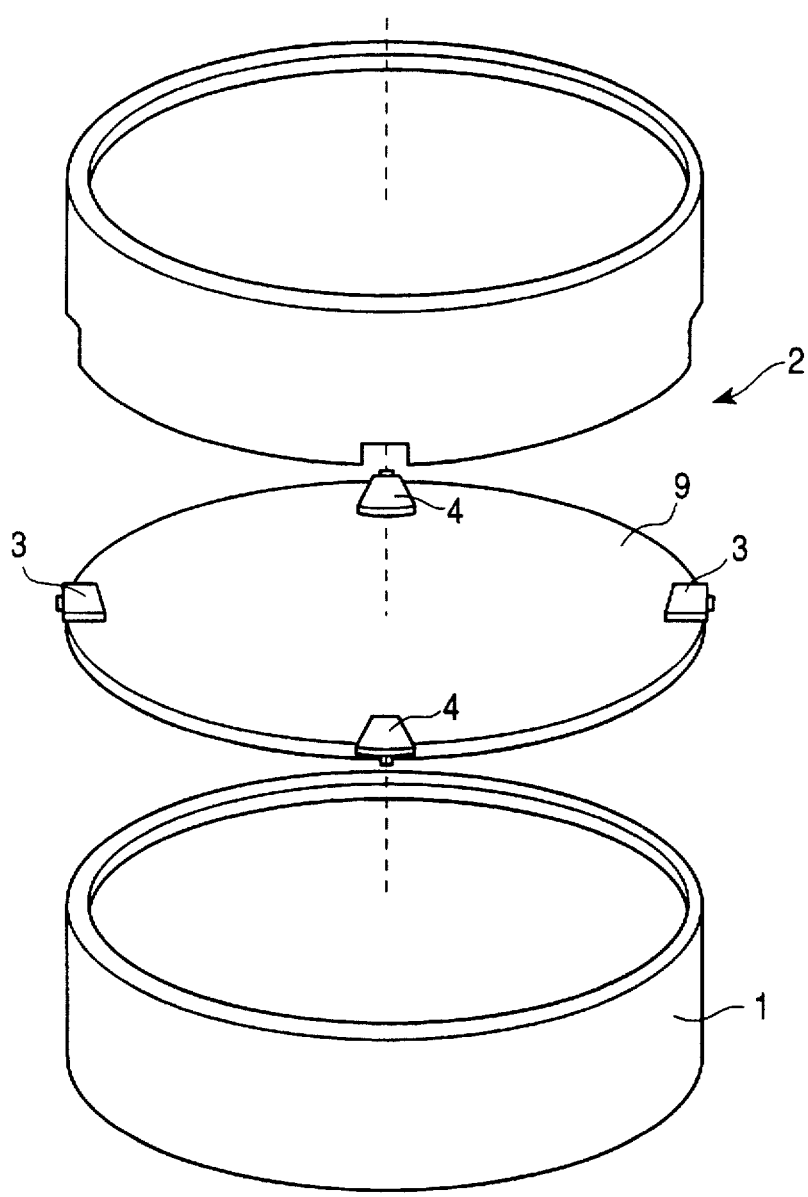
FIG. 3 is a perspective view illustrating an example of the placement of the rotary drum and the active-type head of the first embodiment shown in FIG. 1 and 2.

FIG. 3 shows an example of the placement of the two magnetoresistive element heads 3 and 3, and the two recording heads 4 and 4, which are placed on the circuit board 9 of the rotary drum 2. The magnetoresistive element head 3 is an active-type head, and the recording head 4 is an inductive head.

Figure 4:
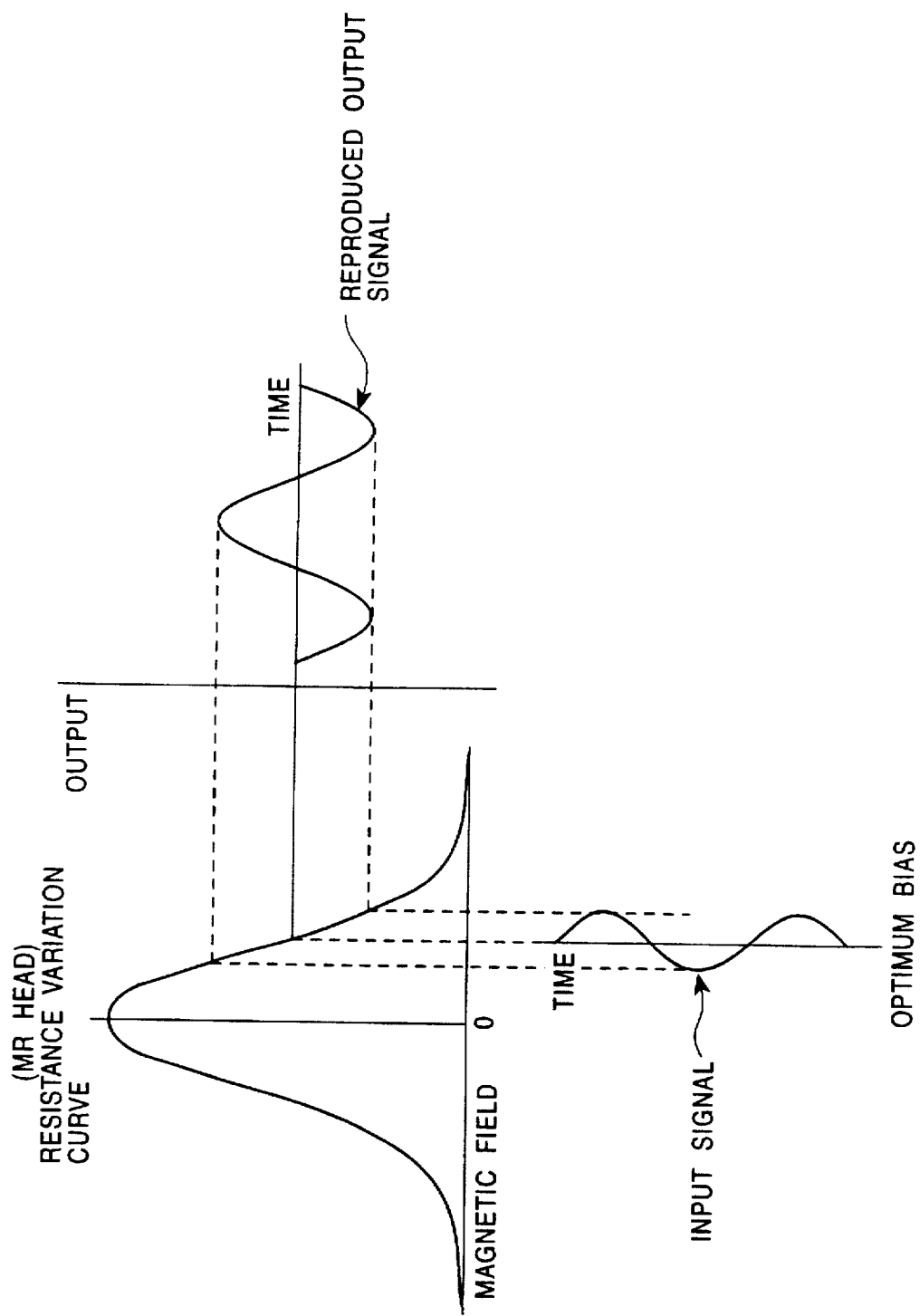
FIG. 4 shows the operating principle of a magnetoresistive element head for reproduction which is an active-type head, and an example of a bias magnetic-field.

FIG. 4 shows the operating principle of a magnetoresistive (MR) element head for reproduction, and a bias magnetic-field. The magnetoresistive element head 3 causes a change in its resistance when the magnetic field changes. This magnetoresistive element head 3 obtains the variations of the signal magnetic-field (input signal) as variations of the reproductive output signal (voltage) by converting the the variations of the signal magnetoresistive into resistance variations. This magnetoresistive element head 3 is capable of obtaining a stable, high reproductive output signal independently of the speed of the magnetic tape.

Figure 5:
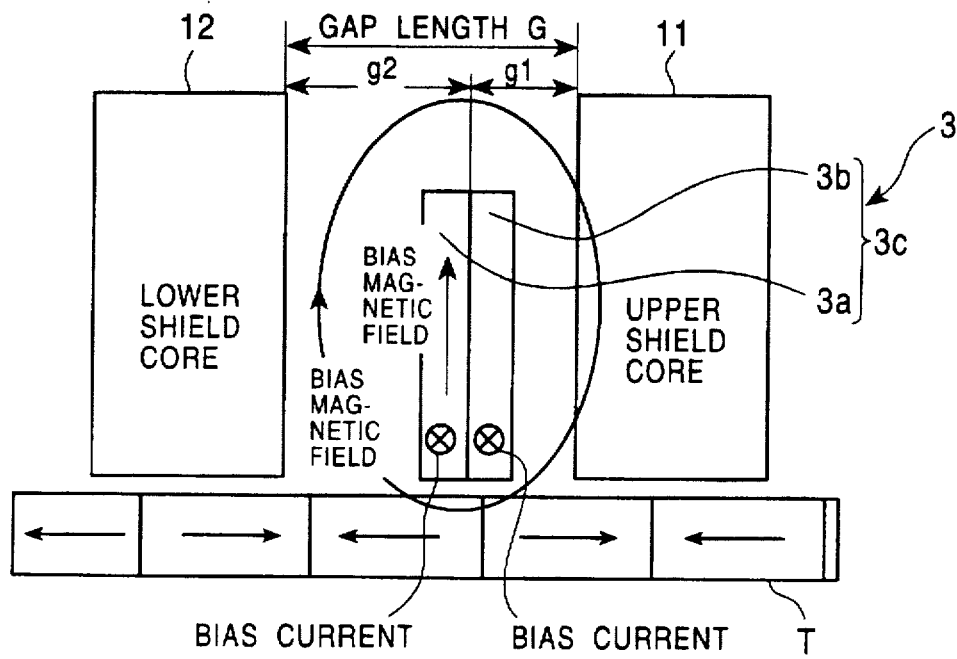
FIG. 5 shows an example of the construction of the magnetic-resistance element head.

Next, FIG. 5 shows a preferred example of the construction of the magnetoresistive element head 3 for reproduction.

Referring to FIG. 5, a magnetoresistive element (MR element) 3a is bonded to a bias conductor 3b. This magnetoresistive element 3a and the bias conductor 3b constitute a magnetic sensing section 3c.

Disposed on both sides of the magnetic sensing section 3c are an upper shield core 11 and a lower shield core 12. The upper shield core 11 and the lower shield core 12 are made of an Ni-Zn polycrystal ferrite or the like.

The magnetic tape T is made to move by a helical scanning method in such a manner as to be parallel to the magnetic sensing section 3c, the upper shield core 11, and the lower shield core 12. On this magnetic tape T, changes of the signal magnetic-field are shown by different arrow directions.

The magnetoresistive element 3a and the bias conductor 3b are electrically connected to each other, and a constant current flows. Since a constant current (bias current) is made to flow through the magnetoresistive element 3a and the bias conductor 3b, a bias magnetic-field is generated. The magnetic sensing section 3c is capable of taking out a voltage variation as a reproductive output signal when the magnetoresistive element 3a converts the variations of the signal magnetic-field of the magnetic tape T into resistance variations. The magnetic sensing section 3c is capable of shutting out the variations in the external magnetic field of other than the magnetic tape T since the magnetic sensing section 3c is surrounded by the shield cores 11 and 12 on both sides.

The spacing between one end surface of the magnetic-resistance element 3a of the magnetic sensing section 3c and the upper shield core 11 is expressed by g1, and the spacing between one end surface of the bias conductor 3b and the lower shield core 12 is expressed by g2. The addition of these spacings g1 and g2 is equivalent to the gap length G between the upper shield core 11 and the lower shield core 12.

Figure 6:
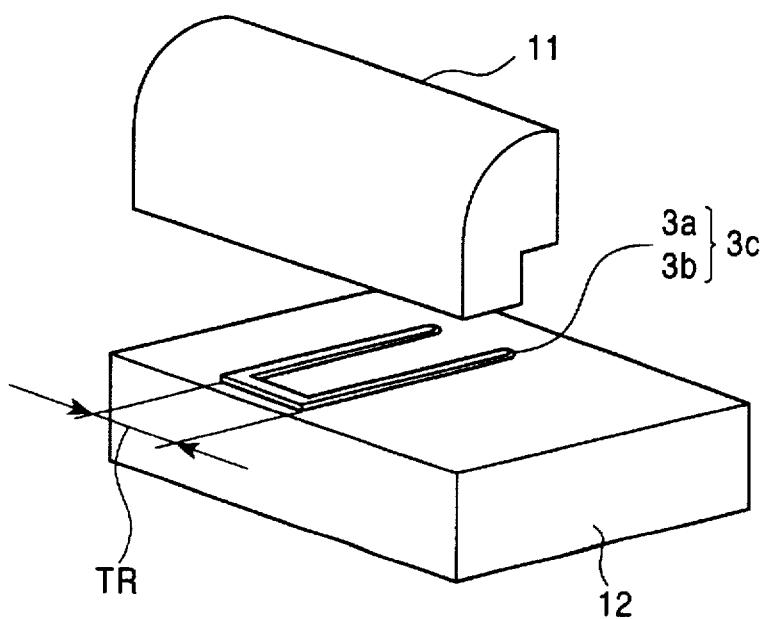
FIG. 6 is an exploded perspective view illustrating an example of the construction of the magnetoresistive element head.

An example of the construction of the magnetoresistive element head 3 is shown specifically in FIG. 6. The magnetic sensing section 3c comprised of the magnetoresistive element 3a and the bias conductor 3b is disposed between the upper shield core 11 and the lower shield core 12. The reference character TR denotes the width of the magnetic sensing section of the magnetoresistive element head 3. This width is substantially equal to the track width of the magnetic tape T.

The magnetoresistive element head 3 which is an active head of FIG. 2 requires energy from outside in the case of an operation of reading (a reproduction operation) information recorded on the magnetic tape T. To be specific, it is necessary for the magnetoresistive element head to supply the DC power from the DC power-supply 10 to a constant-current source contained in the rotary drum 2, and this constant-current source must set a sense current and a bias current for the magnetoresistive element head 3. In contrast to this, in a case in which an inductive head is used as a reproducing head, when an operation of reading the information on the magnetic tape T is performed, no external energy is required since the change in the inflow magnetic flux from the magnetic tape is converted into an induced voltage.

Next, the construction of the first embodiment of the present invention will be described below in more detail with reference to FIGS. 7 to 9.

Figure 7:
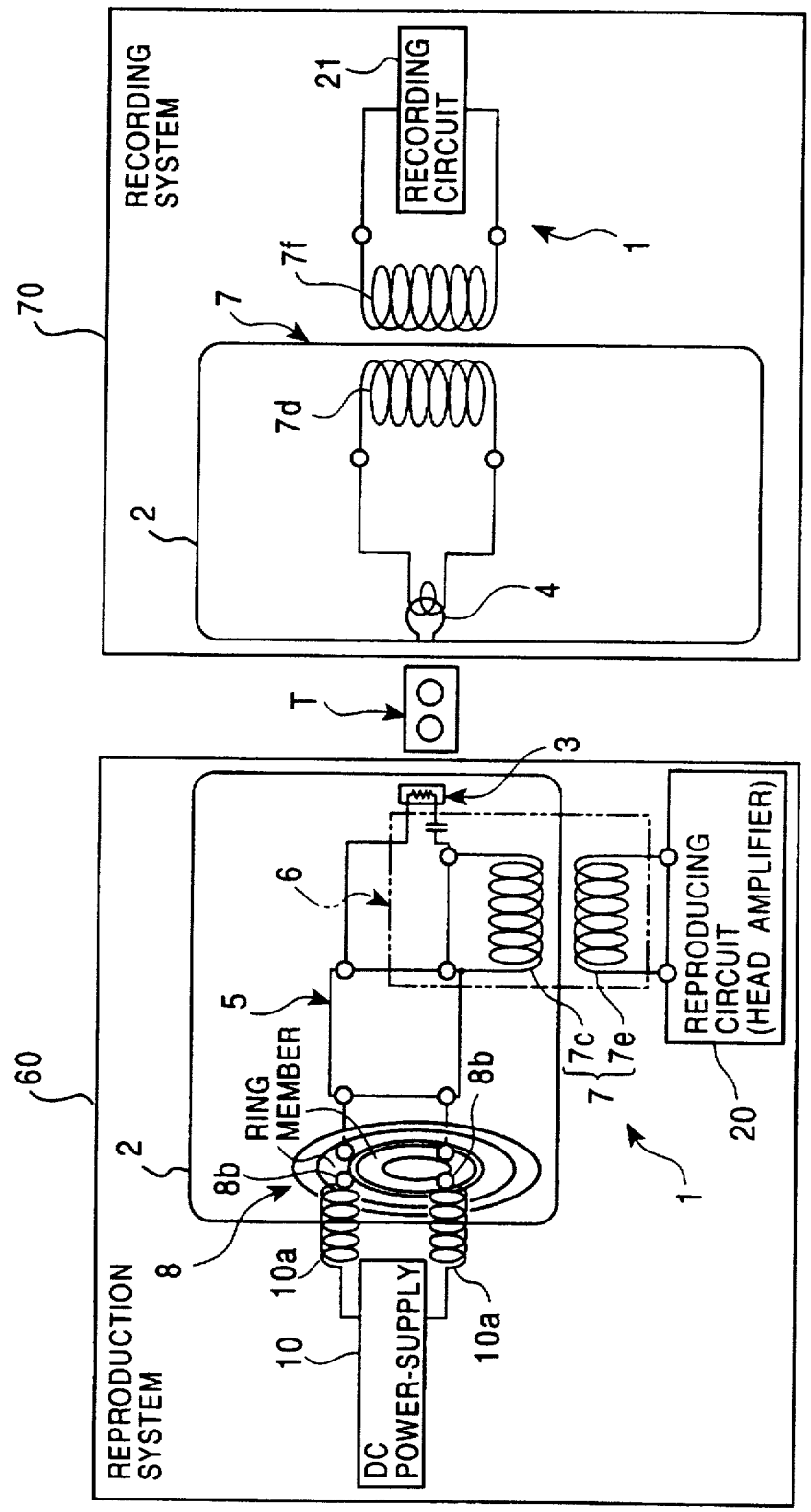
FIG. 7 shows the construction of the rotary magnetic head apparatus employing the magnetoresistive element head according to the first embodiment of the present invention.

FIG. 7 shows a recording system 70 and a reproduction system 60 of the rotary magnetic head apparatus of FIGS. 1 and 2.

The recording system 70 is comprised of the fixed drum 1, the rotary drum 2, and the like. The reproduction system 700 is comprised of the fixed drum 1 and the rotary drum 2.

Disposed on the rotary drum 2 are the slip ring 8, the constant-current circuit 5, the reproductive voltage conversion circuit 6, the magnetoresistive element head 3 for reproduction, a coil 7c of the rotor core of the rotary transformer 7, and the like.

The DC power-supply 10 is a direct-current powersupply disposed outside the rotary drum 2 and the fixed drum 1, and is connected to brush-like electrodes 8b and 8b of the slip ring 8. Ring-shaped electrode portions 8a and 8a of the slip ring 8 are always in contact with the brush-like electrodes 8b and 8b by the forces of springs 10a and 10a, respectively.

The ring-shaped electrode portions 8a and 8a of the slip ring 8 are electrically insulated from each other and are connected to the constant-current circuit 5. The coil 7c of the rotor core and the coil 7e of the stator core of the reproductive voltage conversion circuit 6 face each other with a predetermined spacing.

The magnetoresistive element head 3 is supplied with a constant current for driving the head from the constant-current circuit 5.

In the reproduction system 60 of FIG. 7, the rotary drum 2 includes an inductive recording head 4 and a coil 7d of the rotor core, which coil is connected to the recording head 4. The fixed drum 1 includes a coil 7f of the stator core and a recording circuit 21.

The recording circuit 21 causes a current corresponding to a signal to be recorded to flow through the coil 7f of the stator core. Since the signal is transmitted from the coil 7f of the stator core of the rotary transformer 7 to the coil 7d of the rotor core without contact between the coils, the inductive recording head 4 is capable of recording the signal on the magnetic tape T by a helical scanning method in accordance with the transmitted signal.

Next, the reproducing system 60 of FIG. 7 will be described below in more detail with reference to FIGS. 8 and 9.

Figure 8:
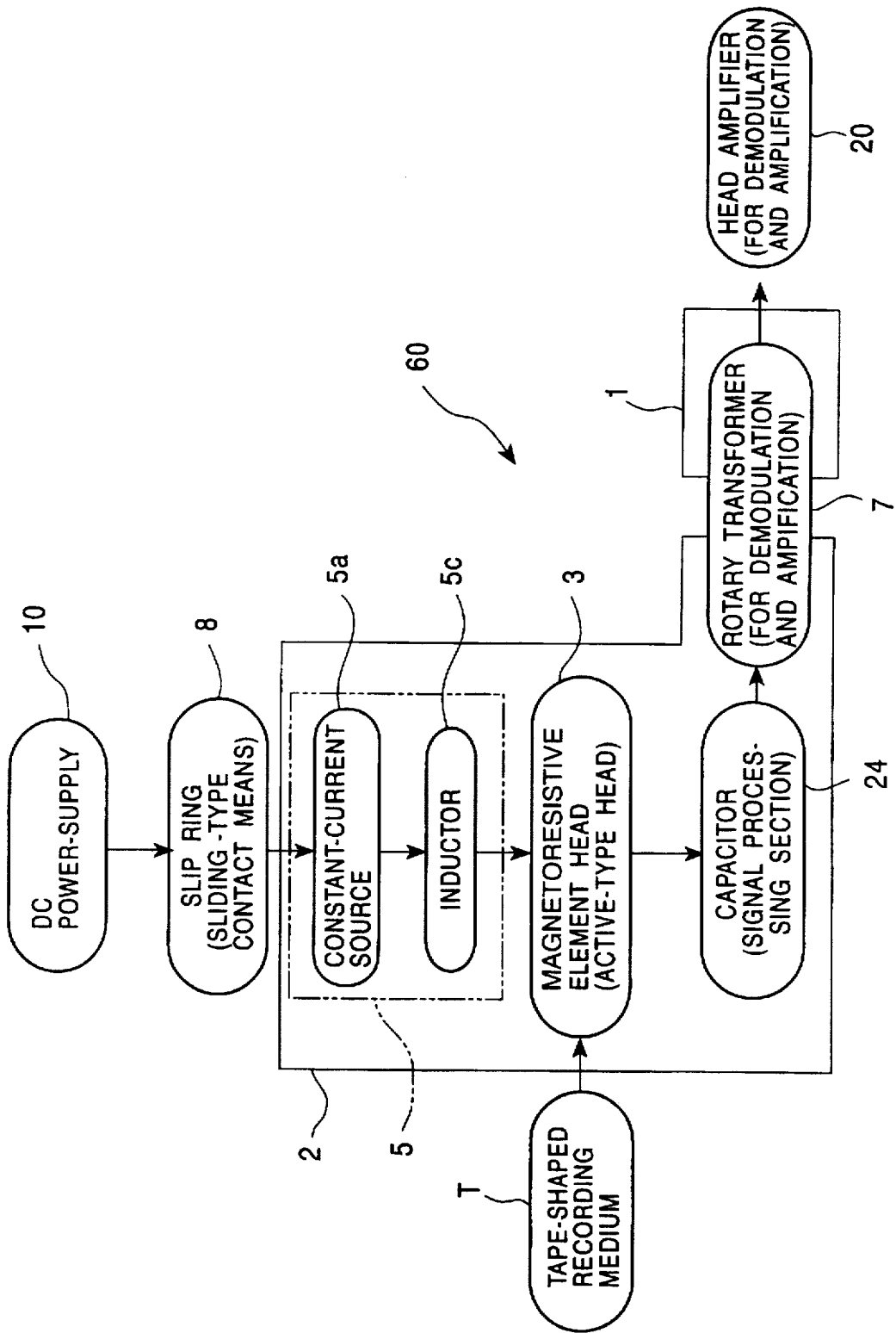
FIG. 8 shows a reproduction system of the rotary magnetic head apparatus according to the first embodiment of the present invention.
Figure 9:
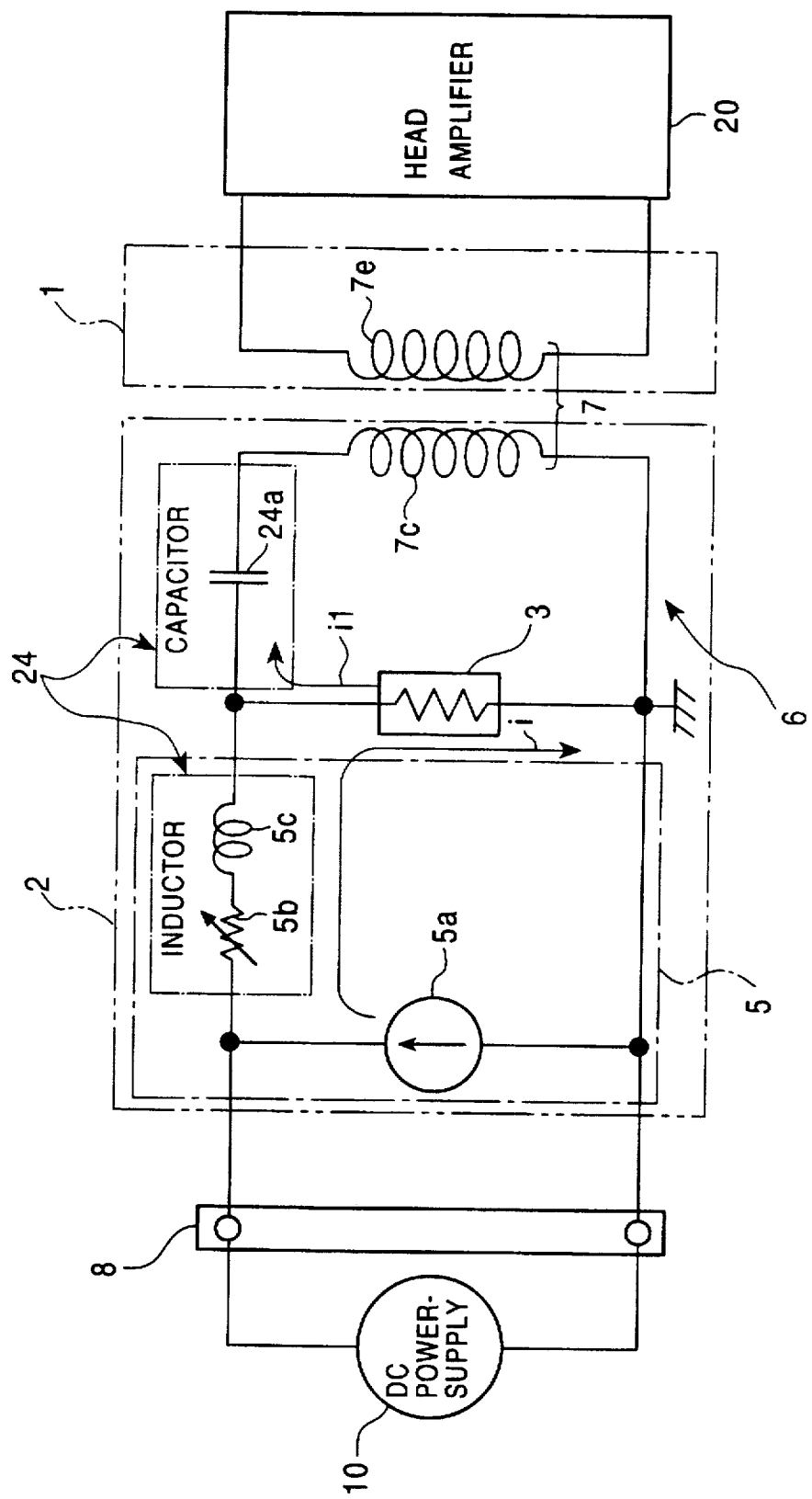
FIG. 9 shows a basic circuit of the rotary magnetic head apparatus of FIGS. 7 and 8.

As shown in FIGS. 8 and 9, the DC power-supply 10 is disposed outside the rotary drum 2 and the fixed drum 1. The rotary drum 2 includes the constant-current circuit 5, a signal processing section 24, the magnetoresistive element head 3, the coil 7c of the rotor core of the rotary transformer 7, and the like. The fixed drum 1 includes the coil 7e of the stator core of the rotary transformer 7. In this example, of course, no problem is posed if a head amplifier 20 is incorporated into the fixed drum 1.

The DC power-supply 10 is connected via the slip ring 8 to a constant-current source 5a of the constant-current circuit 5 in the inner part of the rotary drum 2. The constant-current circuit 5 includes the constant-current source 5a, a variable resistor 5b, and an inductor 5c. The constant-current source 5a sends a sense current and a bias current i to the magnetic-resistance element head 3 via the inductor 5c. In this case, since the inductor 5c is disposed between the constant-current source 5a and the magnetoresistive element head 3, the inductor 5c prevents a decrease in the reproductive output of the magnetoresistive element head 3 as a result of the reverse flow thereof toward the DC power-supply 10 side.

The reproductive voltage conversion circuit 6 is comprised of a capacitor 24a of the signal processing section 24, and the rotary transformer 7. The capacitor 24a of the signal processing section 24 is a capacitor for cutting the DC components in the current flow il of the reproductive output signal of the magnetoresistive element head 3. The electric-current value of the above-described DC bias current i is adjusted by the variable resistor 5b for adjusting a bias current, and the DC bias current i prevents the head output AC components from reversely flowing toward the constant-current source side due to the inductor 5c.

Since the reproductive output signal of the magnetoresistive element head 3 flows through the coil 7c of the rotor core of the rotary transformer 7, the coil 7c transmits a signal to the coil 7e of the stator core without contact between the coils. The current which flows through the coil 7e is demodulated and amplified by the head amplifier 20.

As described above, in the construction of the first embodiment of FIGS. 7 to 9, the DC power-supply 10 is disposed outside the rotary drum 2 and the fixed drum 1, and the DC power-supply 10 is connected to the circuit within the rotary drum 2 via the slip ring 8.

[Second Embodiment]

Next, a second embodiment of the present invention will be described below with reference to FIGS. 10 and 11.

Figure 10:
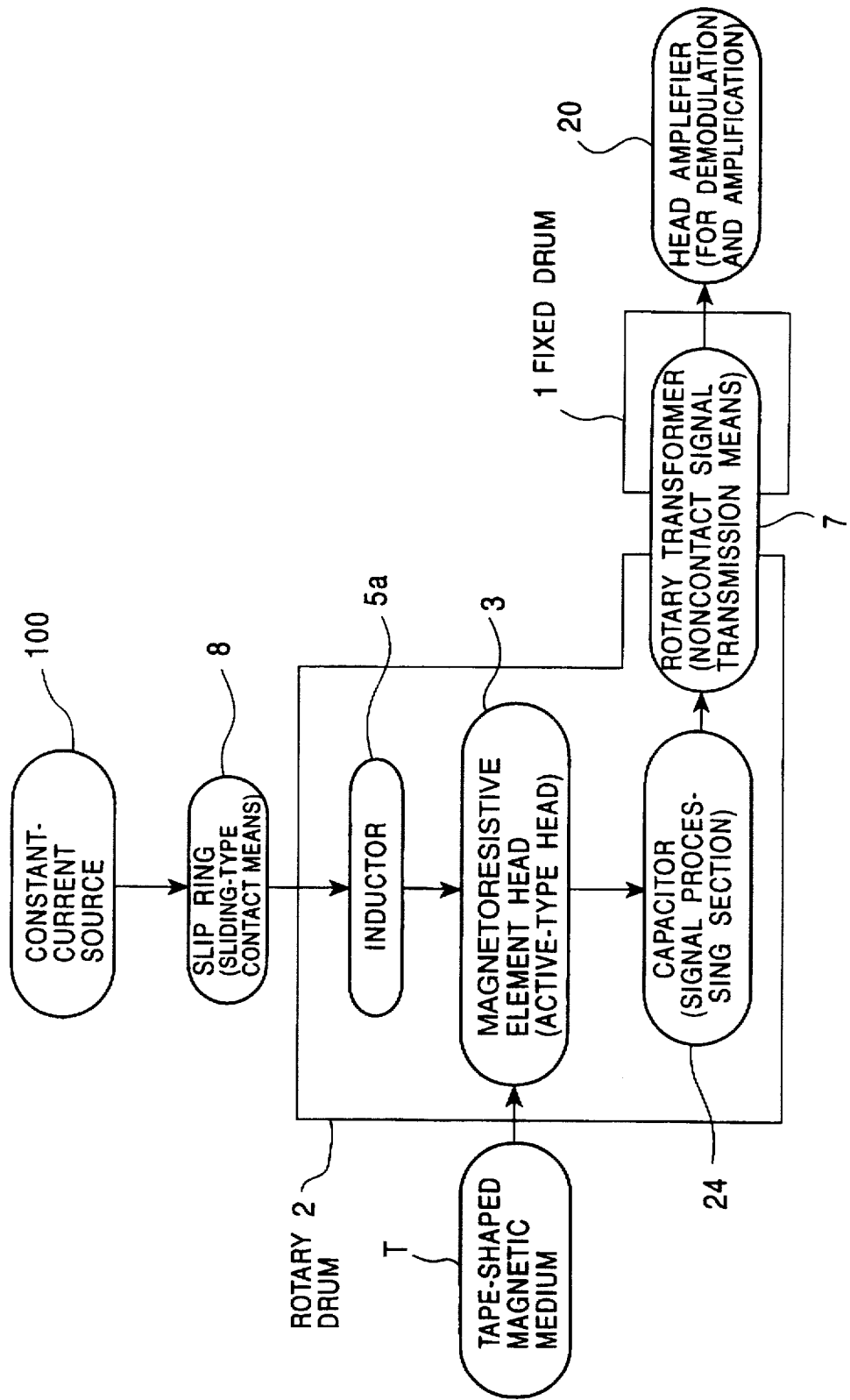
FIG. 10 shows a reproduction system of a second embodiment of the rotary magnetic head apparatus of the present invention.
Figure 11:
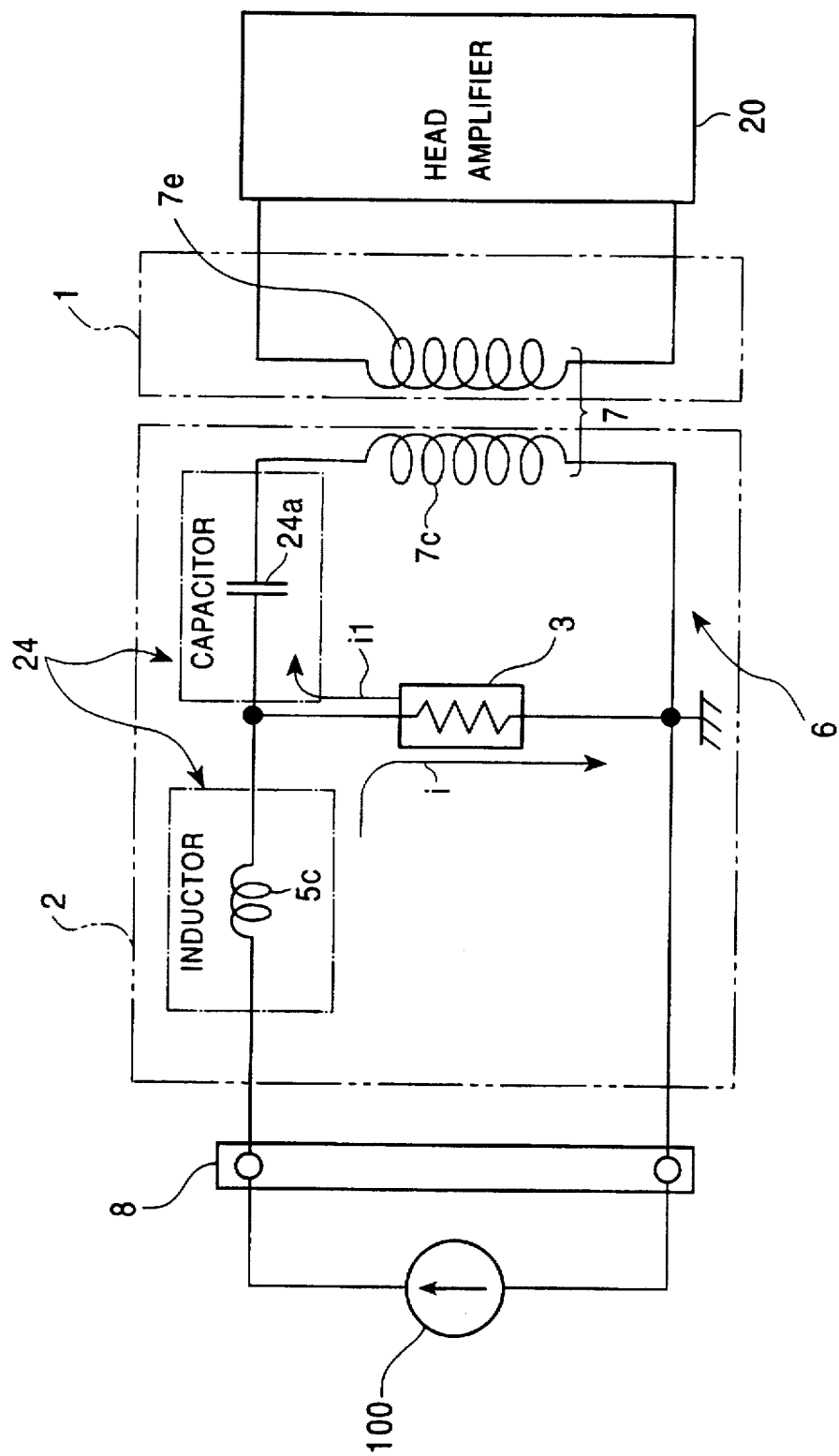
FIG. 11 shows a basic circuit of the reproduction system of the rotary magnetic head apparatus of FIG. 10.
Figure 12:
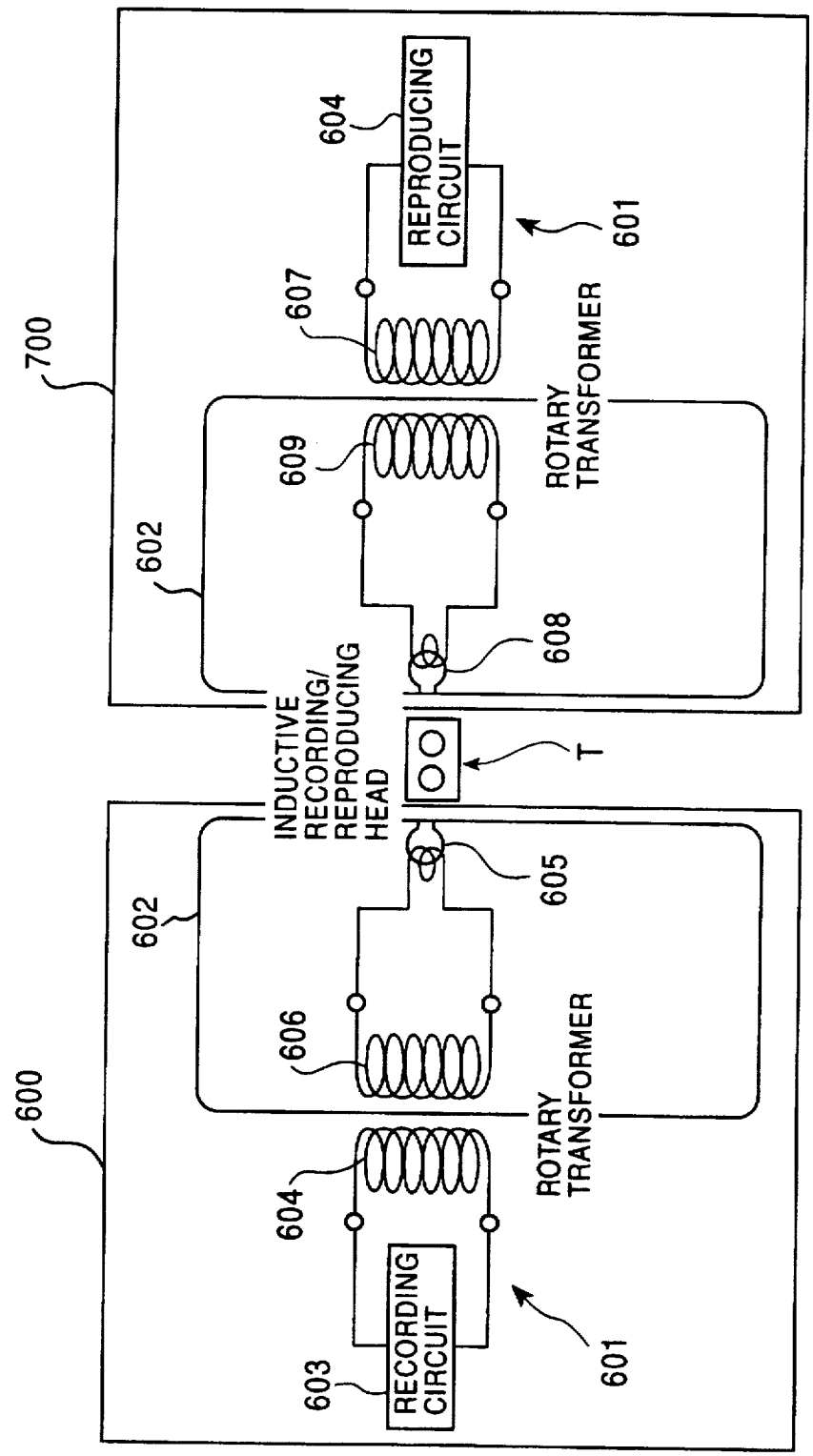
FIG. 12 shows a recording system and a reproduction system of a conventional rotary magnetic head apparatus.

The rotary magnetic head apparatus of the second embodiment of FIGS. 10 and 11 includes the fixed drum 1, the rotary drum 2, a constant-current source 100, the slip ring 8 which is a sliding-type contact device, the rotary transformer 7 which is a noncontact signal transmission means, and the like.

Unlike the case of the first embodiment, the constant-current source 100 is disposed outside the rotary drum 2 and the fixed drum 1 and is connected to the circuit within the rotary drum 2 via the slip ring 8. In the circuit within the rotary drum 2, the inductor 5c of the signal processing section 24 and the magnetoresistive element head 3 are connected to the capacitor 24a of the signal processing section 24.

The reproductive voltage conversion circuit 6 includes the coil 7c of the rotor core of the rotary transformer 7 which is a noncontact signal transmission means and the capacitor 24a of the signal processing section 24. The coil 7e of the rotary transformer 7 is disposed on the fixed drum 1 side. The coil 7c of the rotor core and the coil 7e of the stator core face each other with a predetermined spacing.

The constant current of the constant-current source 100 can be supplied as a constant current for driving the head to the magnetoresistive element head 3 within the rotary drum 2 via the slip ring 8. The DC bias current i of the magnetoresistive element head 3 prevents the head output AC components from reversely flowing toward the constant-current source side due to the inductor 5c. The DC components of the head output current of the magnetic-resistance element head 3 are cut by the capacitor 24a of the signal processing section 24. Then, since the head output current il of the magnetoresistive element head 3 flows through the coil 7c of the rotor core, the coil 7e of the stator core receives the signal in a noncontact manner. As a result, the head amplifier 20 demodulates and amplifies the received signal.

Since the inductor 5c is provided between the slip ring 8 which is a sliding-type contact means and the magnetoresistive element head 3 as described above, it is possible to cut the AC components of the head output of the magnetoresistive element head 3, and a decrease in the reproductive output of the magnetoresistive element head 3 as a result of the reverse flow toward the constant-current source 100 side can be prevented.

In the meantime, as an active-type head, a magnetoresistive element head is described in the above-described embodiment. However, in addition to this, a magnetic head may be used which applies a high-frequency current to a soft-magnetic thin film and detects as electrical-potential variations high-frequency impedance variations due to permeability variations caused by the external magnetic field.

Further, examples of the active head include the following.

A magnetic head for vertical magnetic recording may be used which comprises ferromagnetic metal films which form magnetic poles, an excitation coil for exciting the ferromagnetic metal films, and a microwave waveguide conductor for introducing microwaves.

Further, a magnetic detecting apparatus may be used in which a magnetic substance whose permeability varies by applying a magnetic field from outside is provided in the magnetic-field generated portion in the inside of a distributed constant circuit in which an electromagnetic field is excited, and the external magnetic field is detected by measuring the variations of the electromagnetic-field distribution within a distributed constant circuit, which variations are caused by the variation of the permeability.

Also, a high-density magnetic recording and reproducing head may be used in which a needle-shaped sensing section having a soft magnetic substance whose permeability varies due to a magnetic field and excitation means for exciting this sensing section are provided.

Further, a microwave waveguide-type magnetic reproducing head may be used in which the magnetic substance of the sensing section is formed into at least a two-layer structure of thin films with a non-magnetic layer being sandwiched and the non-magnetic layer forming a magnetic gap.

In addition, a magnetic reproducing head utilizing the magnetic-field variations and having high-frequency permeability may be used.

In the embodiment of the present invention, as an active-type reproducing head, a magnetoresistive element head is used, and a sliding-type contact means, such as a slip ring, is used to supply a constant current for driving this magnetoresistive element. Further, in order to take out a reproductive output signal from the magnetoresistive element head, a noncontact signal transmission means, such as a rotary transformer, is used. In particular, to take out a reproductive output signal, when the circuit of the rotary transformer used in the conventional inductive head is used substantially as it is, the coupling coefficient of the rotary transformer is adjusted. This adjustment serves to avoid the inconvenience of providing a reproduction circuit which is exclusively used for the magnetoresistive element head in the inner part of the rotary drum.

The reliability of the magnetoresistive element head depends upon the fact that the height of the element which determines the lifetime of the magnetoresistive element head is as low as several μm, and the magnetoresistive element head is susceptible to electrostatic breakdown. However, examination by the present inventors confirmed that a lifetime of 100 hours or more could be achieved for the sliding-type magnetoresistive element head having an element height of 3 μm, and electrostatic breakdown did not occur under normal operating conditions.

As described above, in the embodiment of the present invention, an active-type reproducing head having high sensitivity, such as a magnetoresistive element head, is mounted inside the rotary drum. When a magnetic-resistance element head is used as an example of the active-type head, this magnetoresistive element head requires a constant current in order to convert the variations in the external magnetic-field into resistance variations of the element.

Thus, in the first embodiment of FIGS. 7 to 9, a constant-current circuit is made by using a DC power-supply inside the drum, and a constant current is supplied to the magnetic-resistance element head. The magnetoresistive element head outputs the variations in the external magnetic-field sensed by scanning the magnetic tape which is a recording medium as voltage variations.

For example, in the case of a video tape recorder, a a video signal within the reproductive output signal includes output signals for a total of four channels comprising two channels of plus and minus azimuths, and two channels for left and right stereo sound. The use of taking out the signals of these channels outside the rotary drum by a slip ring in the same manner as in the supply power-supply is, unlike the embodiment of the present invention, not desirable when the large number of channels and the deterioration Of the quality of the signals to be handled are taken into consideration. Therefore, in the same way as in the conventional rotary magnetic head apparatus of the helical scanning method, it is necessary to take out the reproductive output signal of the magnetic-resistance element head to the outside via the rotary transformer.

Thus, in the embodiment of the present invention, the reproductive output signal from the magnetoresistive element head is sent to the rotary transformer by performing signal processing necessary to take out the signal via the rotary transformer by the signal processing section. The reproductive output signal which is taken outside the rotary drum via the rotary transformer can be obtained as a video image or data through a demodulation circuit and/or an amplifier circuit in the same way as in the conventional rotary magnetic head apparatus of the helical scanning method.

In the embodiment of the present invention, since an active-type head, such as a magnetoresistive element head having high sensitivity, is used, it becomes possible for the magnetic tape to have a narrow track and a wide band, making it possible to achieve a high transfer rate at a high density.

Further, since an active-type head of a thin film, such as a magnetic-resistance element head, which can easily be formed into multiple channels, can be used in the rotary magnetic head apparatus of the helical scanning method, a still higher recording density and a still higher transfer rate are possible.

The present invention is not limited to the above-described embodiments.

Although the above-described embodiments describe a rotary magnetic head apparatus of, for example, a VHS-type video tape recorder, in addition to this, the present invention may be applied as well to a 8-mm video tape recorder, a digital audio tape recorder (DAT), or a data streamer.

As has been described up to this point, when a helical scanning method is used, DC power for driving can be reliably supplied to an active-type reproducing head provided within the rotary drum, and the reproductive output signal of the active-type head can be taken outside the drum.

What is claimed is:

1. A rotary magnetic head apparatus for reproducing information from a tape-like recording medium by a helical scanning method, said rotary magnetic head apparatus comprising:

a fixed drum;

a rotary drum which is rotatable with respect to the fixed drum;

a magnetoresistive element reproducing head, disposed on the rotary drum, for reproducing information from the tape-like recording medium;

a constant-current circuit, disposed on the rotary drum, for supplying a constant current for driving the head to an active-type reproducing head state;

noncontact signal transmission means for transmitting and output signal which is output by the head when the active-type reproducing head of the rotary drum reproduces information from the tape-like recording medium to outside of the rotary drum; and sliding-type contact means for supplying an external DC power signal to the constant-current circuit of the rotary drum.

2. A rotary magnetic head apparatus according to claim 1, wherein the sliding-type contact means comprises a conductive ring which is set on the rotary drum, and a conductive brush-like member which slides on the outer peripheral portion of the conductive ring.

3. A rotary magnetic head apparatus according to claim 1, wherein the rotary drum comprises a recording head for recording information on a tape-like recording medium by a helical scanning method.

4. A rotary magnetic head apparatus according to claim 1, further comprising said signal processing section for processing the output signal, and said noncontact signal transmission means, and said signal processing section for processing the output signal before the output signal of the active-type reproducing head is transmitted to the outside of the rotary drum by the noncontact signal transmission means constitute a voltage conversion circuit.

5. A rotary magnetic head apparatus according to claim 1, wherein the constant-current circuit includes a constant-current source comprising an inductor.

6. A rotary magnetic head apparatus for reproducing information from a tape-like recording medium by a helical scanning method, said rotary magnetic head apparatus comprising:

a fixed drum;

a rotary drum which is rotatable with respect to the fixed drum;

a magnetoresistive element reproducing head, disposed on the rotary drum, for reproducing information from the tape-like recording medium;

a constant-current source, disposed outside of the rotary drum, for generating a constant current for driving the magnetoresistive element head to an active-type reproducing head state;

sliding-type contact means for supplying a constant current to the constant-current source to the active-type reproducing head of the rotary drum; and noncontact signal transmission means for transmitting an output signal from the head which is output when the active-type reproducing head of the rotary drum reproduces information from the tape-like recording medium to outside of the rotary drum.

7. A rotary magnetic head apparatus according to claim 6, wherein the sliding-type contact means comprises a conductive ring which is set on the rotary drum, and a conductive brush-like member which slides on the outer peripheral portion of the conductive ring.

8. A rotary magnetic head apparatus according to claim 6, wherein the rotary drum comprises a recording head for recording information on a tape-like recording medium by a helical scanning method.

9. A rotary magnetic head apparatus according to claim 6, further comprising a signal processing section for processing the output signal disposed on said drum, said noncontact signal transmission means, and said signal processing section for processing the output signal before the output signal of the active-type reproducing head is transmitted to outside of the rotary drum by the noncontact signal transmission means constitute a voltage conversion output.

10. A rotary magnetic head apparatus according to claim 6, wherein an inductor is provided between the sliding-type contact means and the active-type head.

* * * * *